United States Patent
Chen

(10) Patent No.: US 9,560,712 B2
(45) Date of Patent: Jan. 31, 2017

(54) MODULAR MULTIFUNCTIONAL BIO-RECOGNITION LIGHTING DEVICE

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

(21) Appl. No.: 14/949,847

(22) Filed: Nov. 23, 2015

(65) Prior Publication Data
US 2016/0080615 A1 Mar. 17, 2016

Related U.S. Application Data

(63) Continuation-in-part of application No. 13/220,720, filed on Aug. 30, 2011, now Pat. No. 9,228,731.

(30) Foreign Application Priority Data

Nov. 13, 2015 (CN) .......................... 2015 1 0775914

(51) Int. Cl.

| | |
|---|---|
| H05B 33/08 | (2006.01) |
| F21V 33/00 | (2006.01) |
| H04N 5/225 | (2006.01) |
| G08B 13/196 | (2006.01) |
| G08B 21/24 | (2006.01) |
| G08B 19/00 | (2006.01) |

(Continued)

(52) U.S. Cl.
CPC ....... H05B 33/0857 (2013.01); F21V 33/0052 (2013.01); F21V 33/0076 (2013.01); G08B 13/19619 (2013.01); G08B 19/00 (2013.01); G08B 21/24 (2013.01); H04N 5/2256 (2013.01); G08B 17/113 (2013.01); G08B 21/0492 (2013.01)

(58) Field of Classification Search
None
See application file for complete search history.

(56) References Cited

U.S. PATENT DOCUMENTS

| | | | | |
|---|---|---|---|---|
| 4,090,178 A | * | 5/1978 | Norris | G08B 17/107 340/506 |
| 4,896,145 A | * | 1/1990 | Lewkowicz | F21V 33/0076 307/66 |

(Continued)

FOREIGN PATENT DOCUMENTS

JP     2012022579 A  *  2/2012  ............... G06T 7/20

OTHER PUBLICATIONS

Vesternet, "How Z-Wave Controllers & Devices Work", 2012, available online at http://www.vesternet.com/resources/technology-indepth/how-z-wave-controllers-work.*

Primary Examiner — David N Werner
(74) Attorney, Agent, or Firm — Leong C. Lei

(57) ABSTRACT

A modular multifunctional bio-recognition lighting device includes an LED module having multiple operation modes and an image capture module for video recording, which are arranged in an interior of a housing. The LED module supplies continuous illumination, air quality indication, and flashing light alarming. The housing further includes therein a remote control module for receiving and transmission of infrared ray and voices, an environment module for detecting temperature and humidity, air quality, gas, and smoke, and a recognition module for detecting body temperature and a condition of a bio-target. These modules are electrically connected to a main control board that includes a central processing device.

11 Claims, 16 Drawing Sheets

(51) Int. Cl.
*G08B 21/04* (2006.01)
*G08B 17/113* (2006.01)

(56) References Cited

U.S. PATENT DOCUMENTS

| | | | | |
|---|---|---|---|---|
| 6,975,220 | B1* | 12/2005 | Foodman | G06F 17/3089 340/506 |
| 8,456,568 | B2* | 6/2013 | Wendt | F21V 14/02 348/370 |
| 2008/0177646 | A1* | 7/2008 | Frink | G06Q 10/1091 705/32 |
| 2008/0246844 | A1* | 10/2008 | Chan | F21K 9/13 348/152 |
| 2010/0148672 | A1* | 6/2010 | Hopper | F21V 23/0435 315/113 |

* cited by examiner

MODULAR MULTIFUNCTIONAL BIO-RECOGNITION LIGHTING DEVICE

CROSS-REFERENCE TO RELATED APPLICATION

This is a continuation-in-part of co-pending U.S. patent application Ser. No. 13/220,720 filed on Aug. 30, 2011 and owned by the present applicant.

(a) Technical Field of the Invention

The present invention relates generally to modular multifunctional bio-recognition lighting device, which comprises a detection module having multiple functions is arranged in a lighting device to detect a human body and environmental conditions and to selectively activate the functions according to the current conditions.

(b) Description of the Prior Art

With the advent of maturity of the LED technology, in addition to research and development in respect of energy saving and lighting, the manufacturers have also devoted themselves to the developments of diversified styles and multiplicity of functionality of the LED based devices. Most of the multifunctional LED based devices are developed for household and office applications, having a simple arrangement of combining various different functions, which, however, has a slightly bulky size and requires additional components and associated organization thereof. In addition, maintenance and replacement of components are generally not easy tasks for general consumers.

On the other hand, most of the countries of the world are facing an issue of aging of society and home care service is becoming an important issue. Labor cost for hiring home care attendants is generally expensive and may sometimes requires a lengthy and troublesome government approval process. This is a burden, financially and mentally, to general people who live on monthly salary. Although cloud surveillance facility is currently available in the market, a major drawback is that no immediate action can be taken even when an accident is watched happening on a monitor. This certainly needs further improvement.

SUMMARY OF THE INVENTION

A need for combining and integrating the currently used LED detection products and remote monitoring products together as a stand-alone system is certainly desired by the general consumers and would surely satisfies the needs for adequate home care service and building of intelligently controlled household environments.

An example is proposed in US Patent Publication No. 2008/0177646 A1, which discloses a work site remote monitoring and employee time tracking system, wherein personnel information under surveillance, together with on-site biometric scanning data, is transferred through network to a user end in order to determine the movement ranges and behavior of the employees for the purpose of employee management. Such a system needs an additional device to determine if an employee has come into a surveillance range and would be difficult for applications of household environment monitoring.

Japanese Patent Applicant No. 2012-22579 discloses a standing wave radar involving an built-in LED lighting device that is operable to detect the distance and biological or physiological conditions of a human body based on which lighting and alarm may be activated and that may be installed in a building, a transportation vehicle, and even a road to cope with different applications. However, a major drawback is that efficient detection abnormality of a human body with high detection precision is generally not available for such a device and the range of detection of such a device is generally short, making it difficult for applications in a household or interfering environment.

The present invention, through combination of a lighting device and multiple techniques of detection and remote control, provides a modular multifunctional bio-recognition lighting device, which improves, from the point of view of structure, a detection function that is conventionally of a relatively low precision, and integrate household appliances that are commonly used in a household environment, and uses a system to identify the condition of human body combined with corresponding devices so that the modular multifunctional bio-recognition lighting device according to the present invention possesses practical utilization and comprises: a housing having an interior in which an LED module having multiple operation modes and an image capture module for video recording are arranged. The LED module supplies continuous illumination, air quality indication, and flashing light alarming. The housing further includes therein a remote control module, an environment module, a recognition module, and a main control board. The remote control module is for receiving and transmission of infrared ray and voices. The environment module is for the functions of detecting temperature and humidity, air quality, and gas and smoke. The recognition module is for detecting body temperature and a condition of a bio-target. Through electrical connection made between a main control board that comprises a central processing device with the above modules, the recognition module conducts a series of automatic and inter-connected applications among the modules and has the capability of learning and identifying the target and the environment set-up standards to achieve activation and de-activation of a corresponding function. As such, it is possible to achieve environment detection and remote control and monitoring of a target and allowing for an immediate response for activation and de-activation of a corresponding function to help improve residence quality and security and is easy to use.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
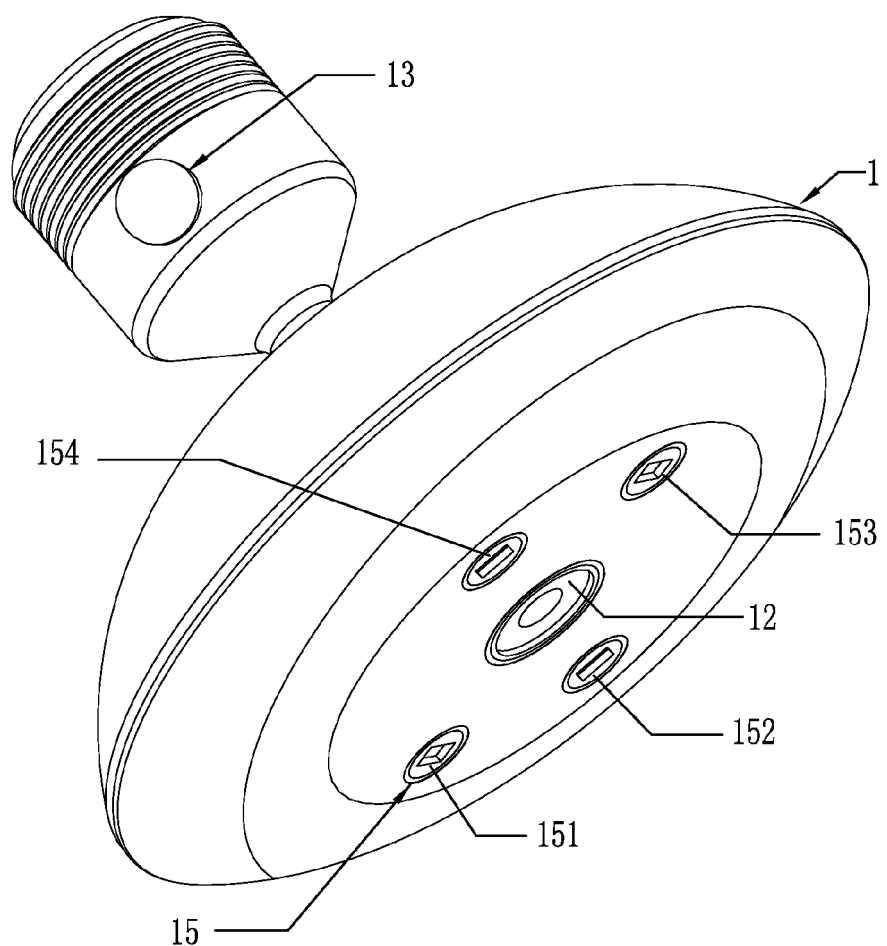
FIG. 1 is a perspective view of the present invention.
Figure 2:
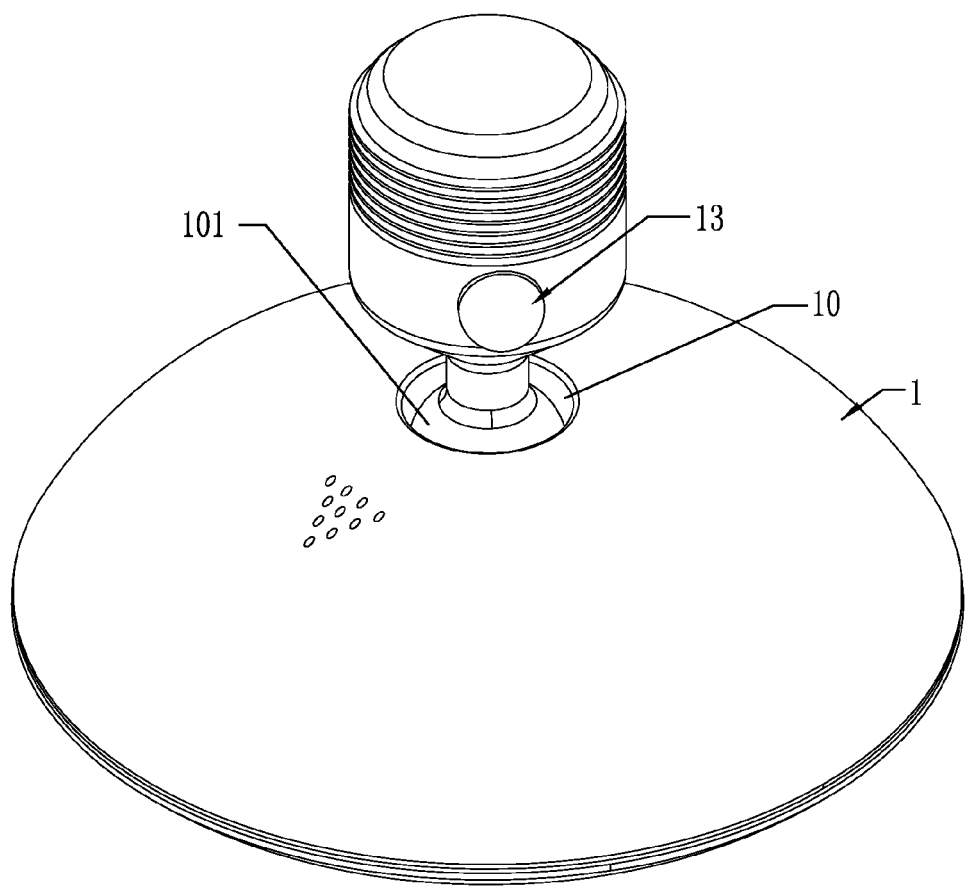
FIG. 2 is another perspective view of the present invention taken from a different angle.
Figure 3:
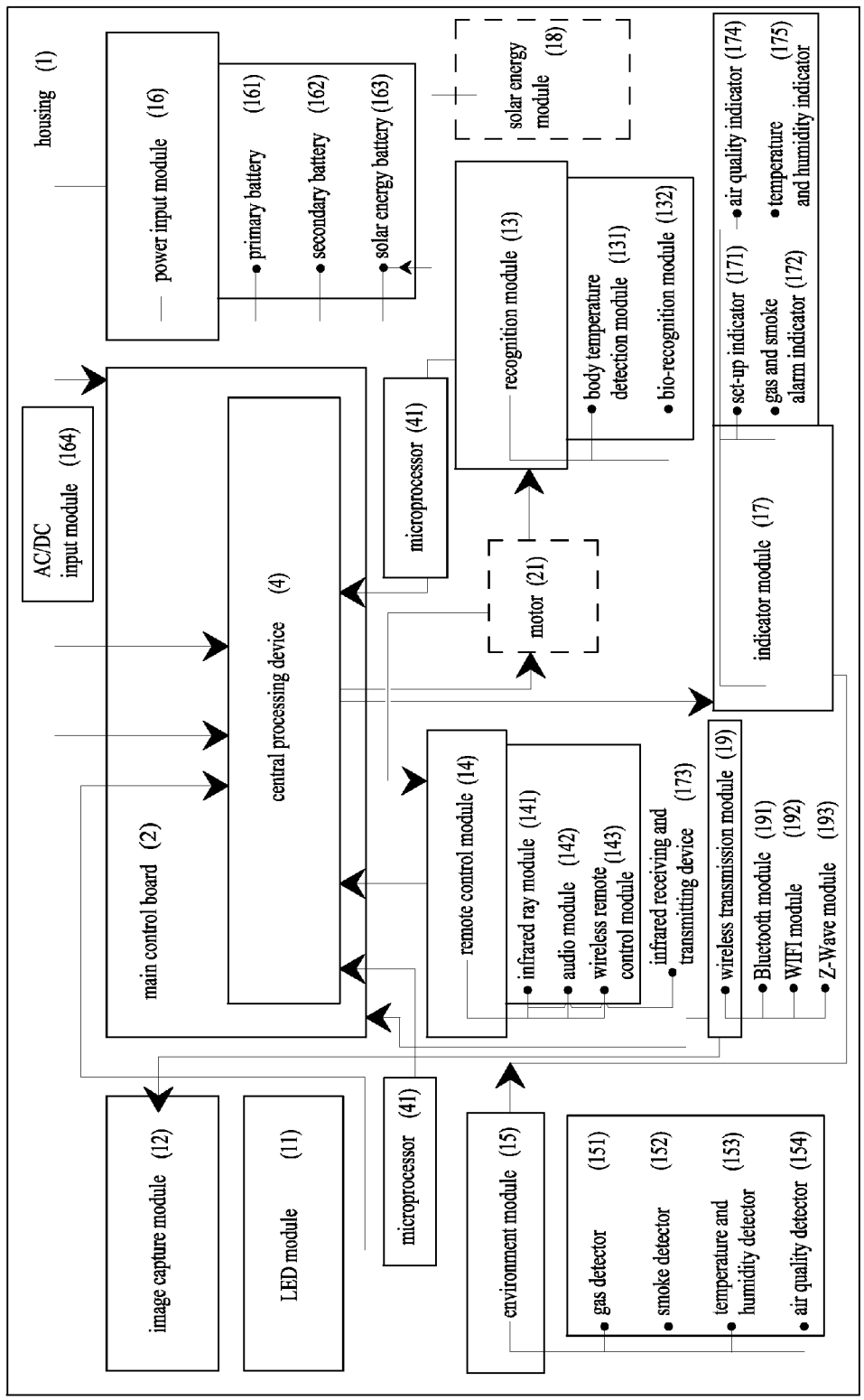
FIG. 3 is a block diagram of the present invention, illustrating an operation flow of various modules.
Figure 4:
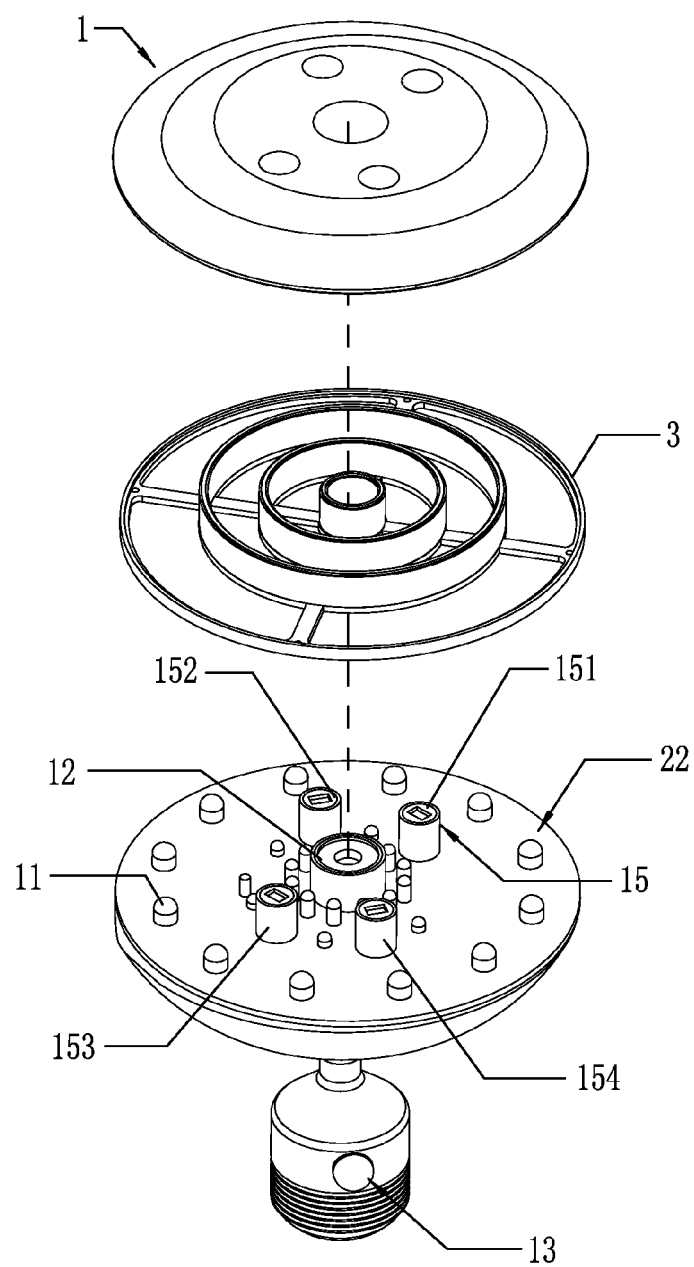
FIG. 4 is an exploded view of the present invention.
Figure 5:
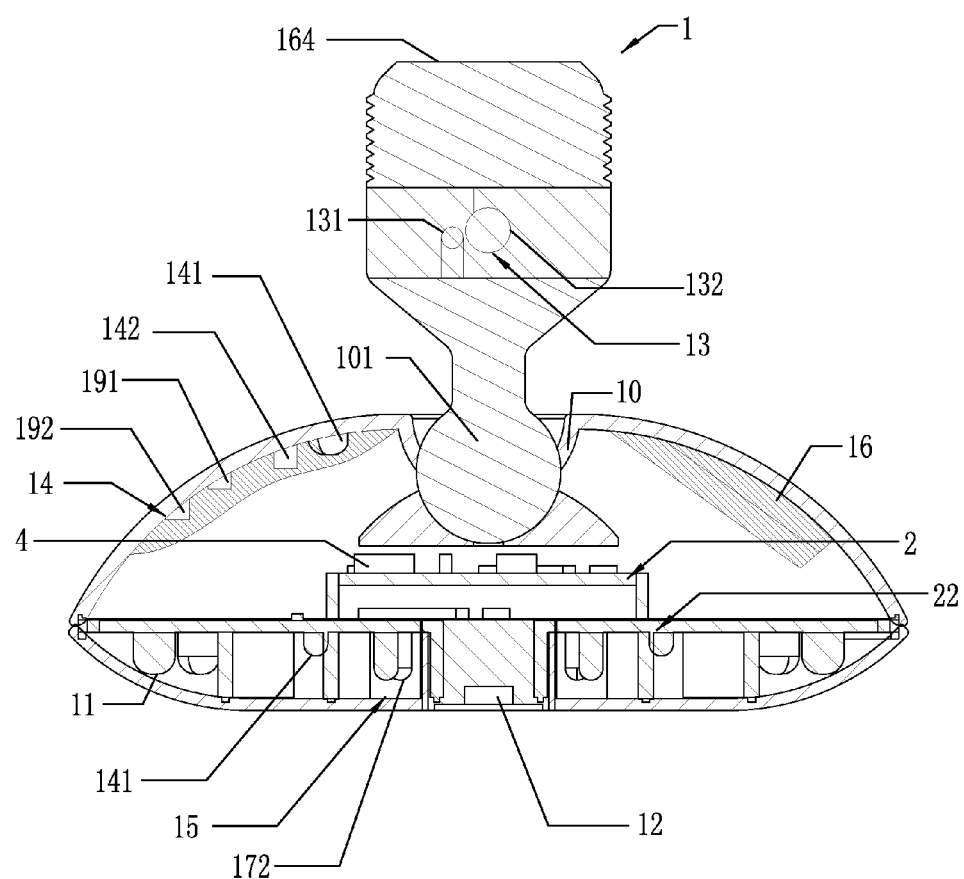
FIG. 5 is a cross-sectional view of the present invention.

The present invention provides a modular multifunctional bio-recognition lighting device, which as shown in FIGS. 1-5, generally comprises: a housing (1), in which a light-emitting diode (LED) module (11) having multiple operation modes and a image capture module (12) are mounted, wherein the LED module (11) supplies continuous illumination, air quality indication, and flashing alarming and the LED module (11) is mounted on an LED board (22); the image capture module (12) functions for video recording and is provided with a separation hood (3) having a configuration comprising multiple layers serving as an arrangement of separation that prevents light sources or components from interfering with each other; a pivotal joint seat (10) and an associated universal joint end (101) are mounted to the housing (1) (the underside as shown in FIG. 4) to allow for angular adjustment of the housing (1); a remote control module (14), which functions to receive and transmit infrared ray and audio signals; an environment module (15), which involves functions of detecting temperature and humidity, air quality, and gas and smoke; a recognition module (13), which functions for detecting body temperature and recognizing a condition of a bio-target; a main control board (2), which is electrically connected to the previous modules and the LED board (22), the main control board (2) comprising a central processing device (4) providing a function of activation and de-activation by identifying a target and an environment set-up standard, wherein the main control board (2) and the LED board (22) can be of a single board arrangement or a multiple board arrangement, but not limited thereto. For example, the LED module (11) may provide different magnitudes of illumination in different periods of time or stores solutions corresponding to the preferences of a user; and the image capture module (12) may conduct selective recording at specific time points or conduct recording when specific conditions are met in case a user that is seldom identified in a predetermined range or is not stored in the central processing device (4), all these being conditions that could be provided for activation of the main control board (2).

The environment module (15) comprises a gas detector (151) for detecting and inspecting hazardous gases outside the housing (1) and a smoke detector (152) for detecting and inspecting smoke outside the housing (1). The two detectors have the priority of receiving power supply to maintain in an activation condition for security purposes, even in case of power failure or insufficiency of total power supply. This provides home security and protection against occurrence of fires and gas explosions. In addition to the above to detectors, the environment module (15) also comprises a temperature and humidity detector (153) for detecting temperature and humidity outside the housing (1) and an air quality detector (154) for inspecting air outside the housing (1). Data of detection obtained with the above four detectors that are fed to a microprocessor (41) are provided to the central processing device (4) of the main control board (2) for identification in order to activate/de-activate corresponding operations. Further, the air quality detector (154), the temperature and humidity detector (153), and the gas detector (151) of the environment module (15) help monitor quality and contents of air, temperature and humidity, and concentration of gases contained in air of the surrounding environment of a user and comparison is made with a database of the central processing device (4) to track sleeping quality of the user. The operations of these detectors may provide a reminder to a predetermined user before any undesired event occurs for prevention purposes. In case that no response is made to the reminder and for example, the gas concentration continuously increases to approach a dangerous situation, then information may be transmitted through a network to a fire department and such information includes the gas concentration that is currently detected, address, images, or other data to help the fire fighters to handle the on-site situation.

The function of the remote control module (14) is achieved with an infrared ray module (141), which transmits coding through an infrared remote control for receiving and transmission of signal to achieve connection with household appliance that involves infrared ray; an audio module (142), which receives and captures a voice instruction of a user and a microphone and speaker may be involved for receiving and recognition, and broadcasting of sounds; and a wireless remote control module (143), which comprises a receiver and a transmitter to control corresponding devices.

A wireless transmission module (19) comprises: a Bluetooth module (191), which uses the Bluetooth technology for connection, in a short distance, with a Bluetooth household appliance and a WIFI module (192), which uses WIFI to connect a WIFI household appliance at a long distance, and may further comprises a Z-Wave Module™ (a radio control module designed to achieve reliable communication and operation between different products from different manufactures) (193) that is operated in an energy-saving manner for wireless transmission and having a transmission distance between the former two modules. One or more modules may be selected according to the size of the space of the surrounding environment.

The above description provides an operation that data are fed from each of the modules to the central processing device (4) of the main control board (2) for identification and the remote control module (14) and the wireless transmission module (19) are the operated to control household appliances connected to the modules.

The recognition module (13) further comprises: a body temperature detection module (131), which functions to detect temperature or movement of a target; a bio-recognition module (132), which functions to detect the location and human body performance of the target and is embodied as a Doppler radar, in which frequency of amplitude is used to acquire desired data. Specifically, a movement signal of a middle to high frequency band of a breathing signal is involved and when a breathing signal is detected and according to the movement signal, a resident is identified moving beyond a fixed time, it is determined that the resident is in an abnormal condition. Thus, using standing wave analysis, the detection range or distance can be expanded and abnormality can be detected with high precision. Detection data of both are supplied to the microprocessor (41) and then fed to the central processing device (4) of the main control board (2) for identification so as to conduct a series of automatic coupling applications among the modules and devices.

The main control board (2) further comprises an indicator module (17), which comprises: set-up indicator (171), a gas and smoke alarm indicator (172), an air quality indicator (174), and a temperature and humidity indicator (175). The set-up indicator (171) functions to give off intermittent flashing alarms when a detection input signal is received or if it is set to give off the alarms during operation. The gas and smoke alarm indicator (172), the air quality indicator (174), and the temperature and humidity indicator (175) are connected to the central processing device (4) of the main control board (2) to determine if to provide a hint according to the data measured by the environment module (15). The indicator (175) is not limited to any specific color and is allowed, according to the need of practical production or being controlled by the central processing device (4) to give off alarm light of different colors according to different standards and corresponding to the environment module (15), wherein four colors, red, blue, green, and orange, are involved to change to scenario lighting color according to APPs of a smart phone for relaxing the surrounding atmosphere during a specific occasion or holiday.

The power input module (16), in addition to being electrically connected to and supplied by the main control board (2), can be supplied by a primary battery (161), a secondary battery (162), or a solar energy battery (163) to ensure normal operation of each of the detectors/sensors in the interior without being affected by the condition of power supply from the main control board (2). Specifically, the secondary battery (161) and the solar energy battery (163) have the advantages of extended time of use and repeated replenishment of power. The arrangement of the solar energy battery (163) make it possible to use in a street lamp, where electrical power can be stored and preserved in daytime in order to reduce energy consumption. However, the housing (1) is still provided with an AC/DC input module (164) for maintaining the supply of power for the entire device.

The LED module (11), the image capture module (12), the recognition module (13), the remote control module (14), the wireless transmission module (19), the environment module (15), and the power input module (16) allow for connection among all household electrical appliances so that the present invention may achieve an embodiment of smart home that requires a cost much less the financial burden required in the current market. An application based on the previous description will be given below.

After installation by a user, the remote control module (14) may provide connection with a dehumidifier, an air-conditioner, a television set, an electrical fan, a heater or a thermostat that involve infrared remote controls. There are also advanced voice control household appliances and in this case, the audio module (142) is used to record and covert correct pronunciation, or allow for definition of quick keys according to the preference of a user, a commonly used device being a microphone, which allows the audio module (142) to record and store sounds and voices that are supplied to the central processing device (4) for identification and control for example household appliances that involve voice control.

Further connection can be made to the recognition module (13) so that when a user enters the house, with the human body being detected by the body temperature detection module (131) and searched and transmitted by the microprocessor (41) to the central processing device (4), lighting and air-conditioner/heater connected to the remote control module (14) can be activated immediately and adjusted according to the preference of the user. However, an advanced use of the bio-recognition module (132) in combination with the image capture module (12) allows for routing inspection of temperature, location, distance, frequency of breath, and heartbeat of a user for detection of abnormality. Once detected, the abnormal condition is transmitted, in the form of image, together with address to an associated organization or an emergency contact preset by the user. The data of measurement may also be stored and converted into living condition parameter so that when the user falls asleep or leaves, the household appliance may be temporarily shut down and may resume operation when the user wakes up or gets back. Further, with the environment module (15), inspection of environment temperature and humidity may be conducted to automatically activate or de-activate the dehumidifier; or when air quality is poor, an air purifier may be activated. According to different needs, the recognition module can be a combination of the body temperature detection module (131) and the image capture module (12), or a combination of the bio-recognition module (132) and the image capture module (12), but not limited thereto and allowing for more flexibility for applications.

Figure 6:
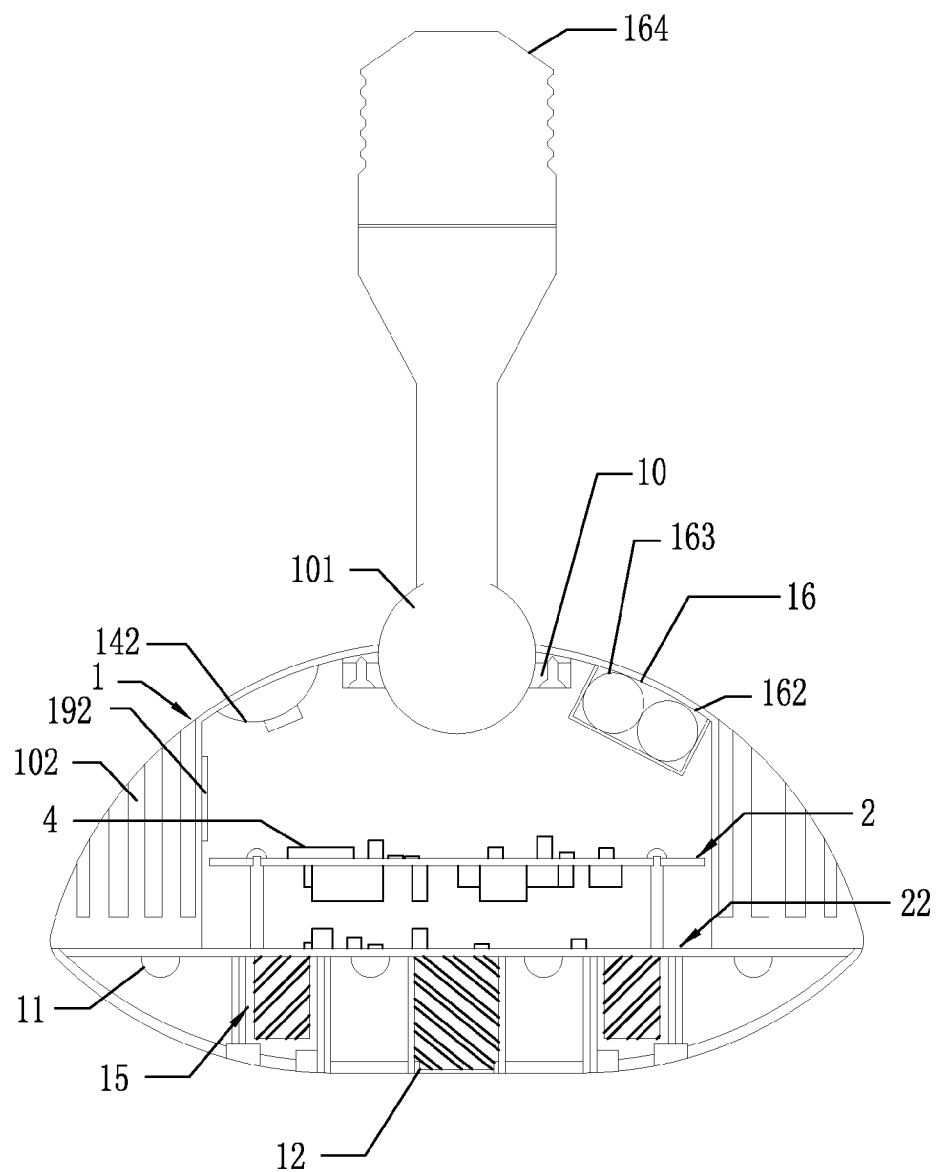
FIG. 6 is a cross-sectional view of a second embodiment of the present invention.
Figure 7:
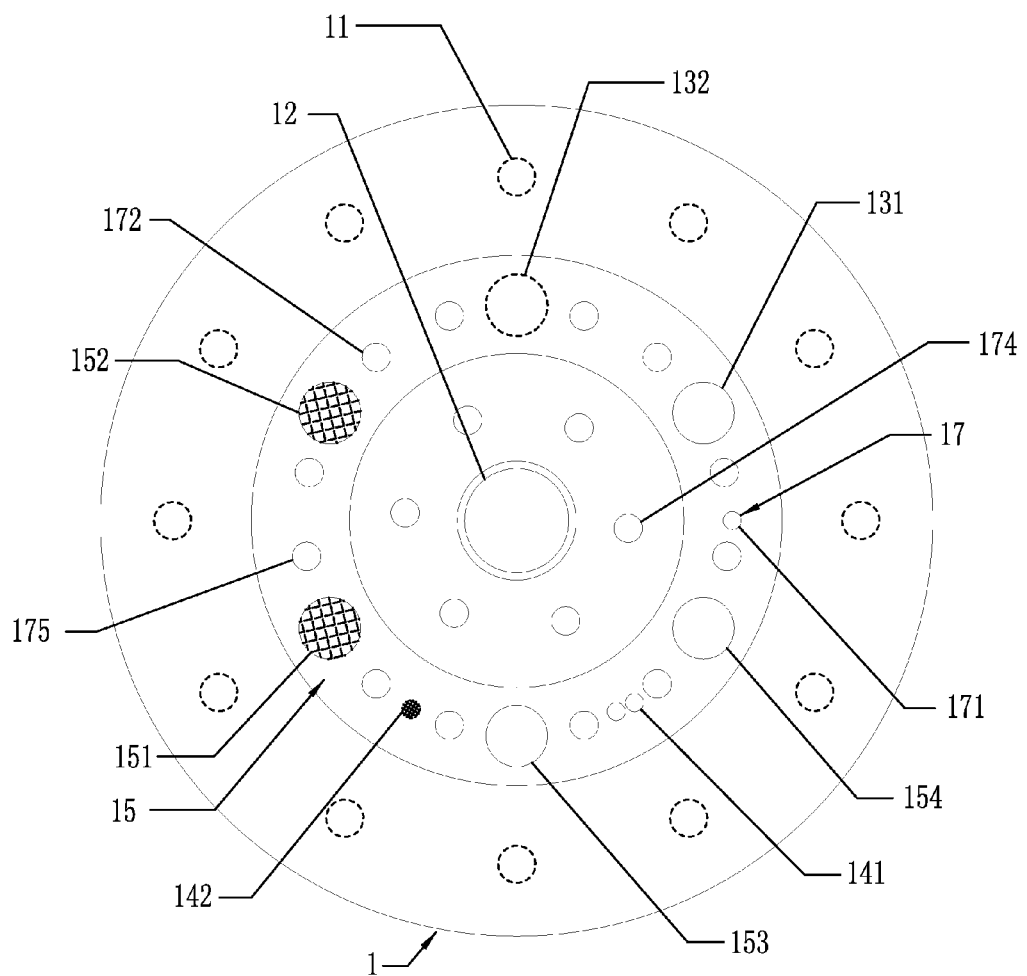
FIG. 7 is a bottom view, in an enlarged form, of the second embodiment of the present invention.
Figure 8:
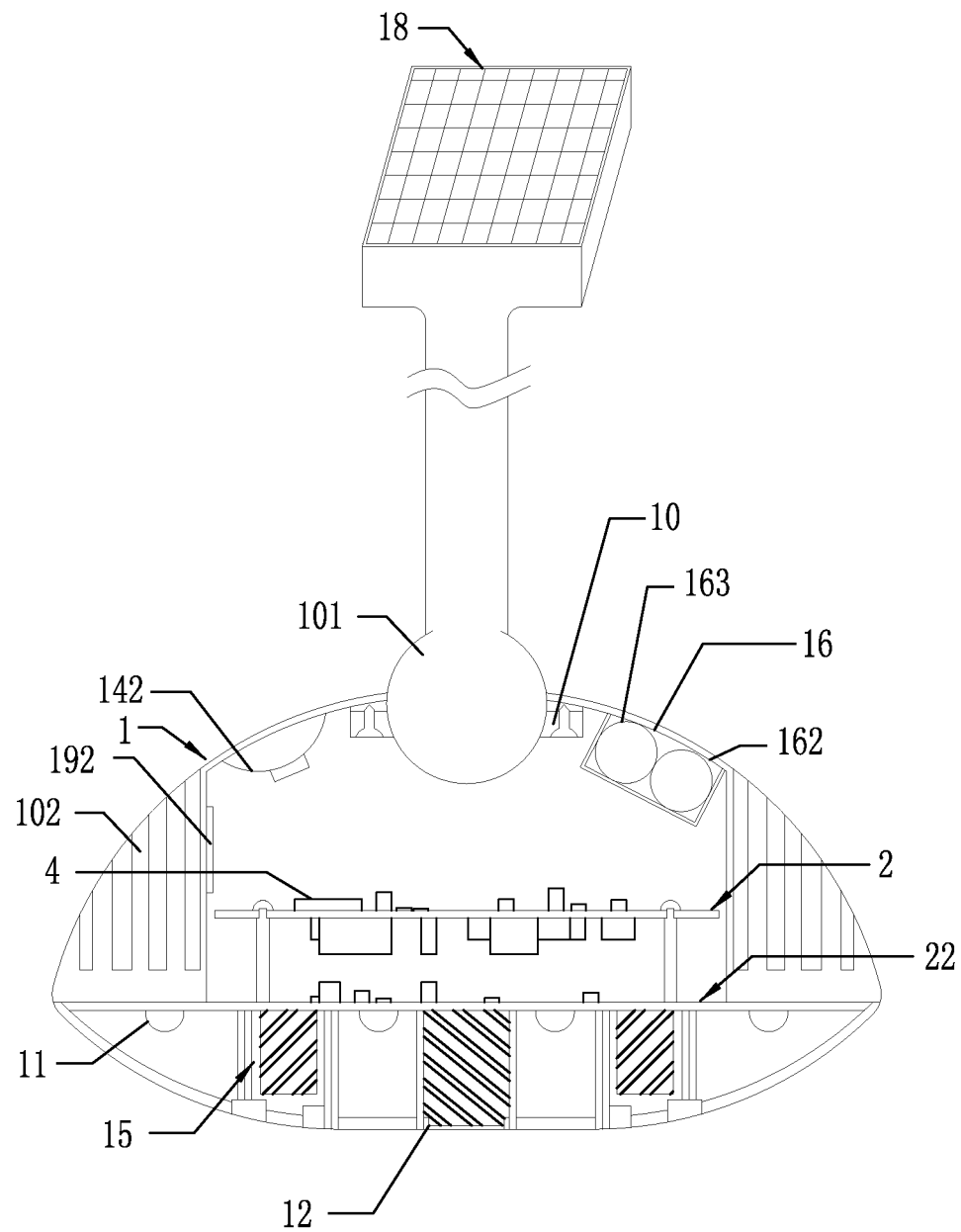
FIG. 8 is a schematic view illustrating the second embodiment of the present invention additionally including a solar energy module therein
Figure 9:
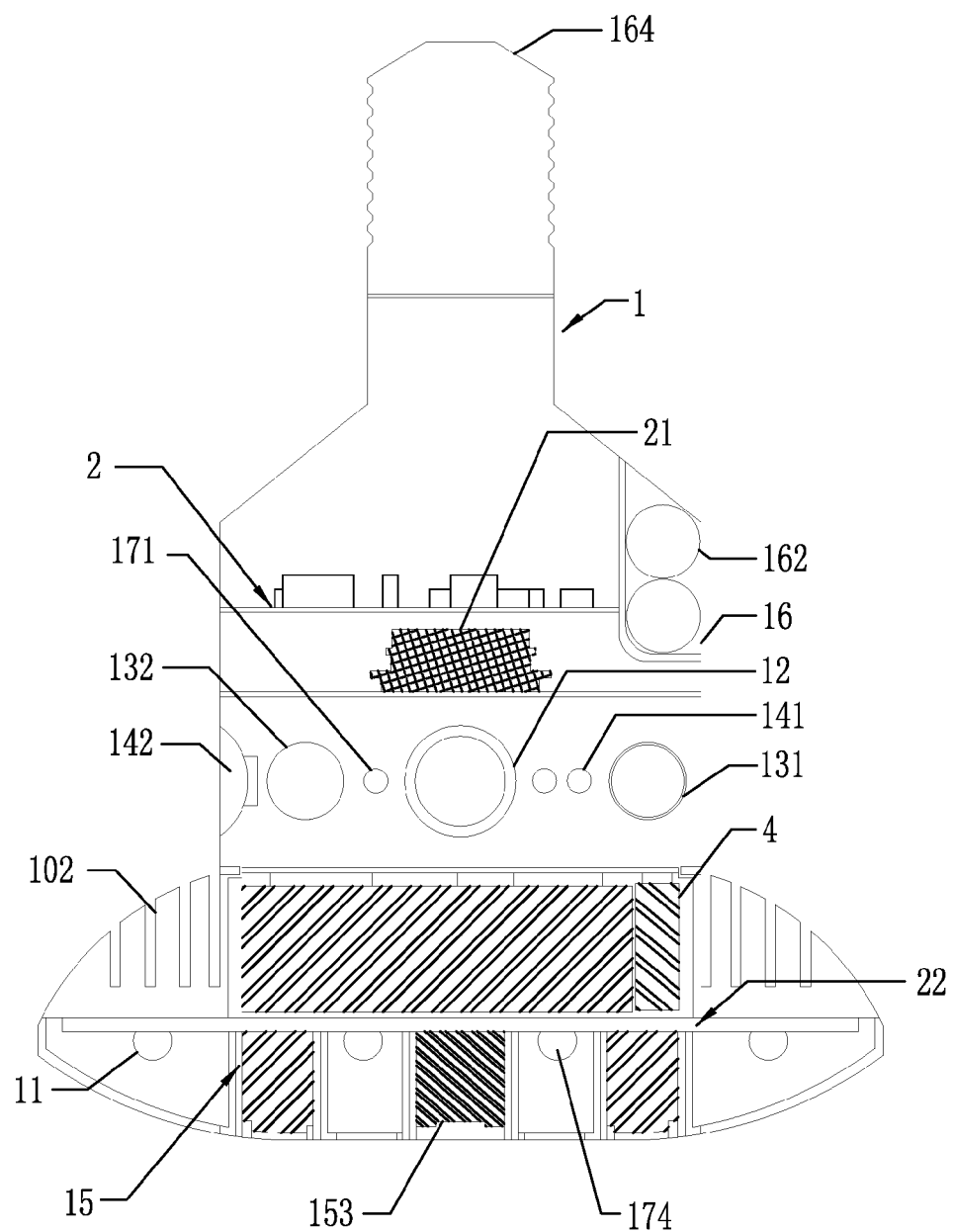
FIG. 9 is a cross-sectional view of a third embodiment of the present invention.
Figure 10:
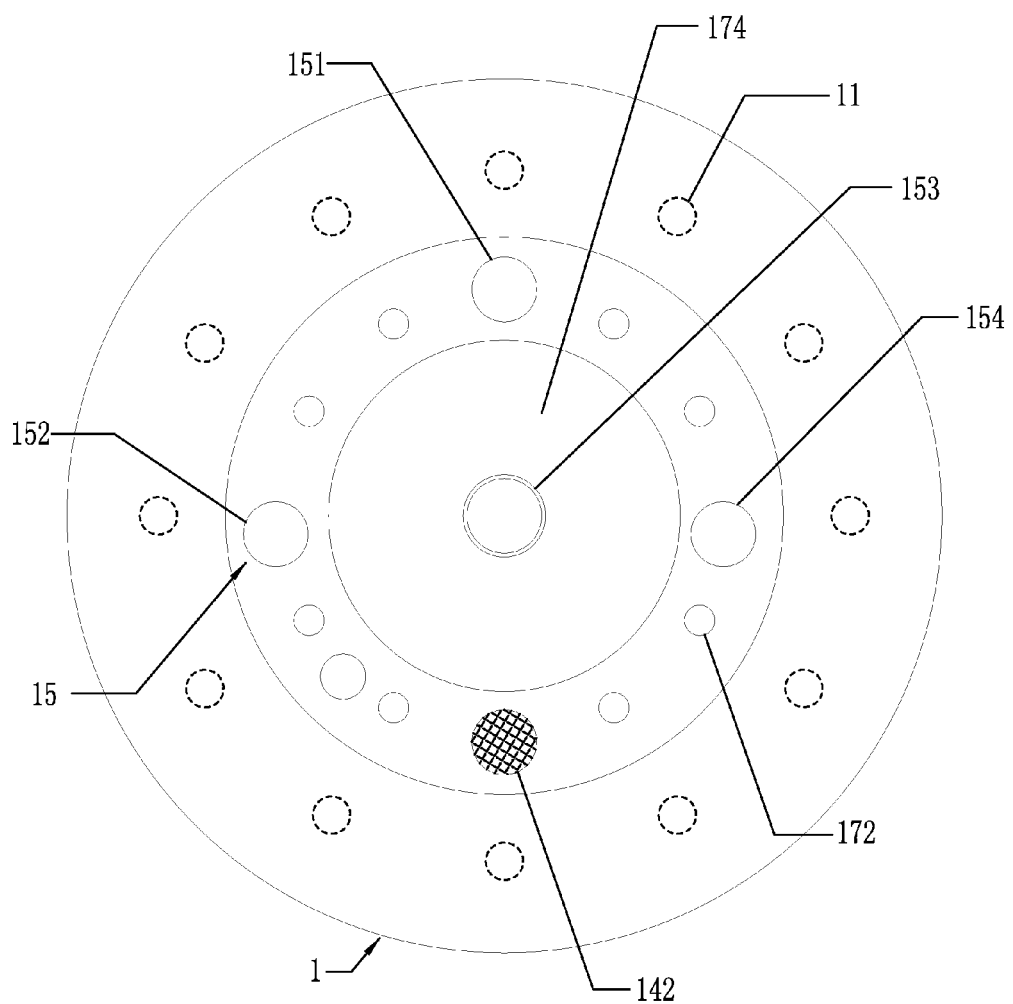
FIG. 10 is a bottom view, in an enlarged form, of the third embodiment of the present invention.
Figure 11:
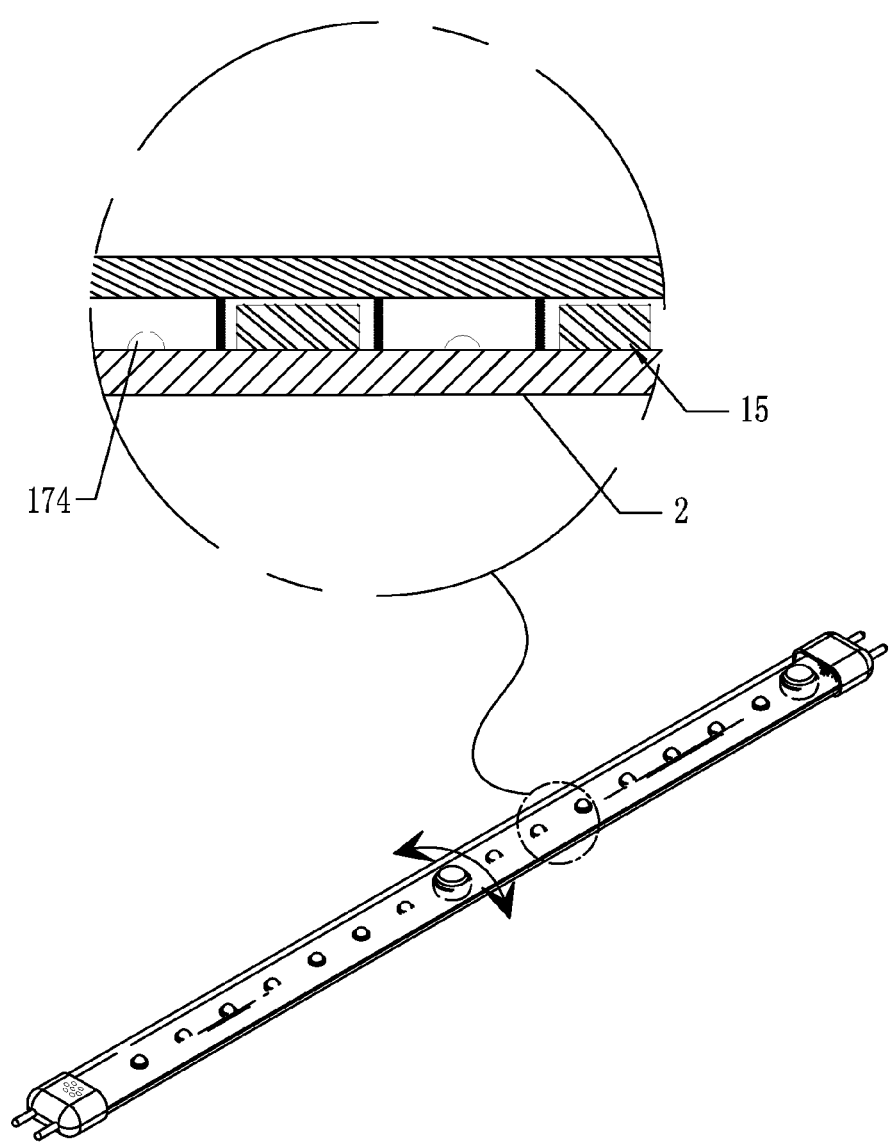
FIG. 11 is a schematic view, in an enlarged form, illustrating a portion of a fourth embodiment of the present invention.
Figure 12:
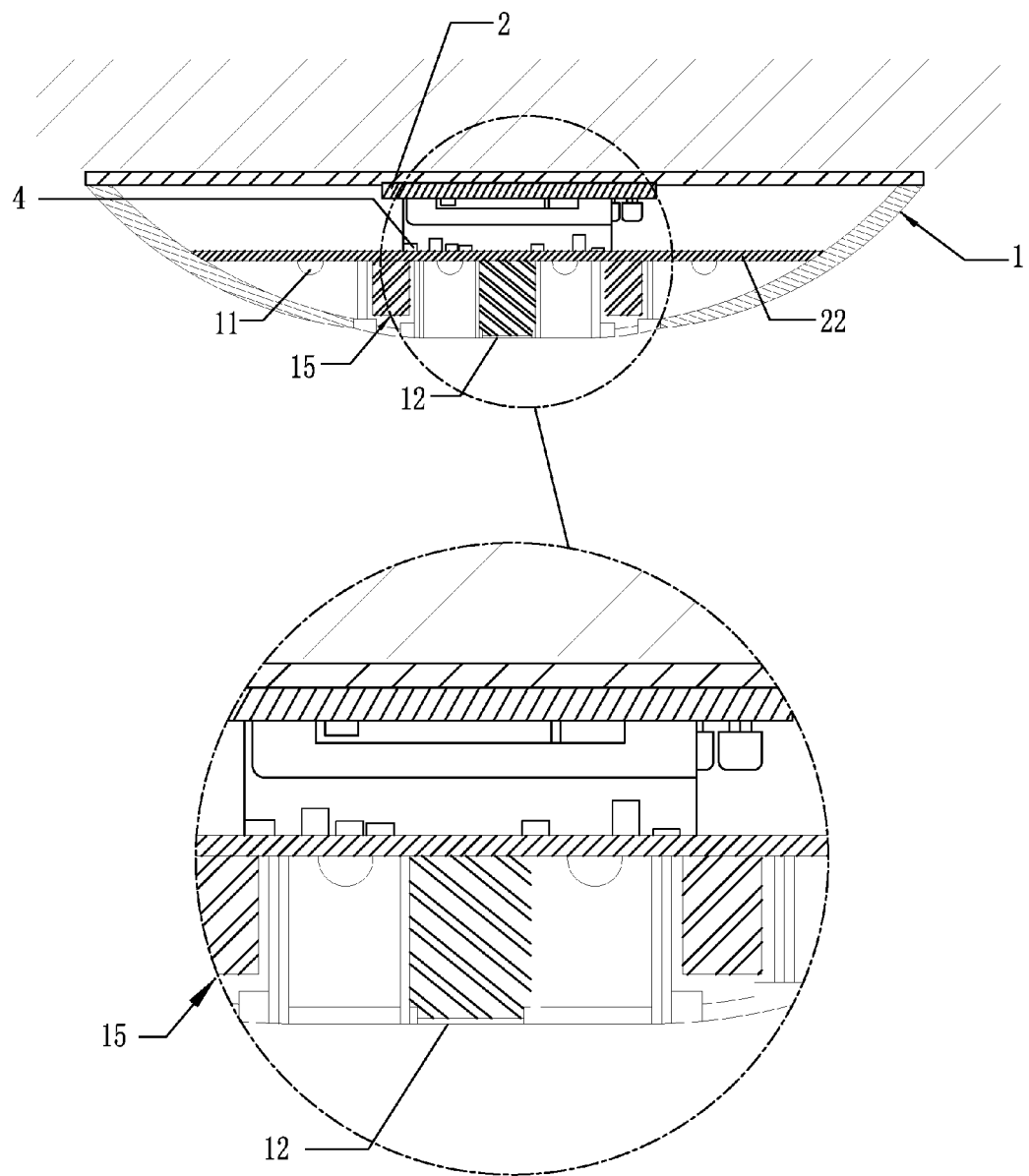
FIG. 12 is a schematic view, in an enlarged form, illustrating a portion of a fifth embodiment of the present invention.
Figure 13:
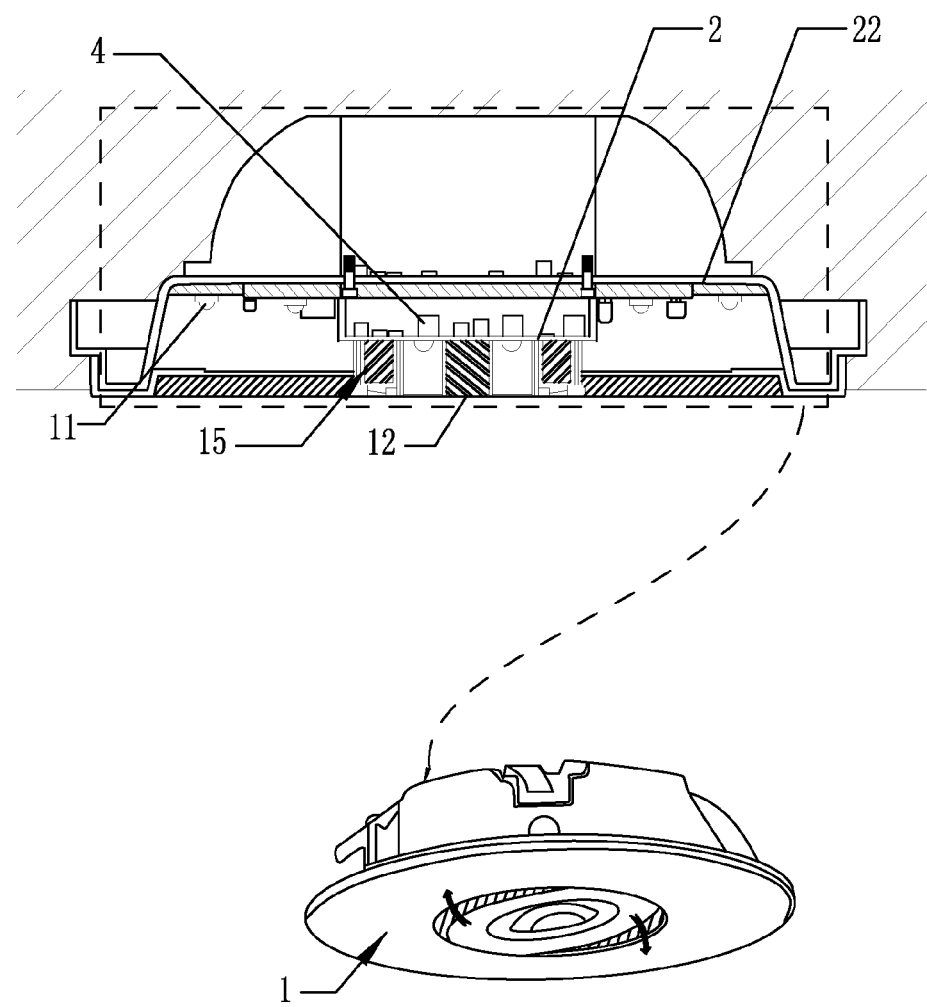
FIG. 13 is a schematic view illustrating a sixth embodiment of the present invention.
Figure 14:
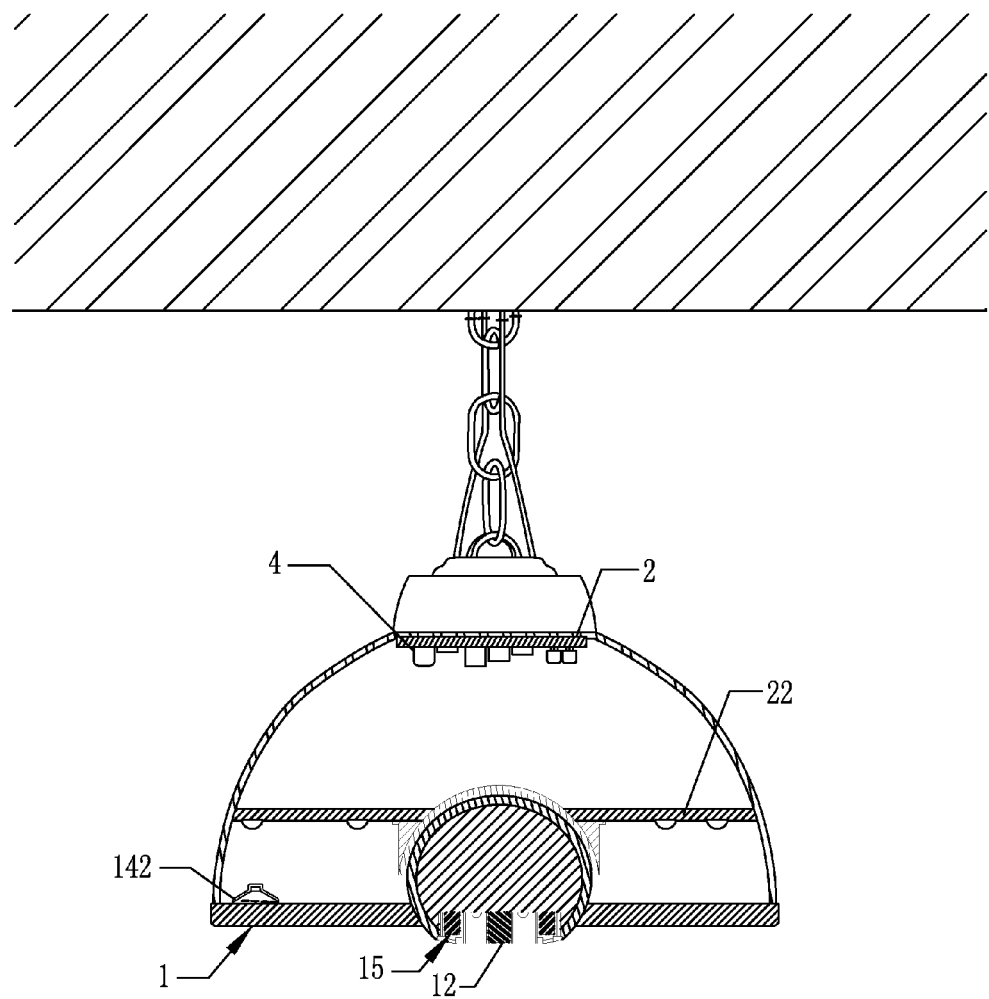
FIG. 14 is a schematic view illustrating a seventh embodiment of the present invention.
Figure 15:
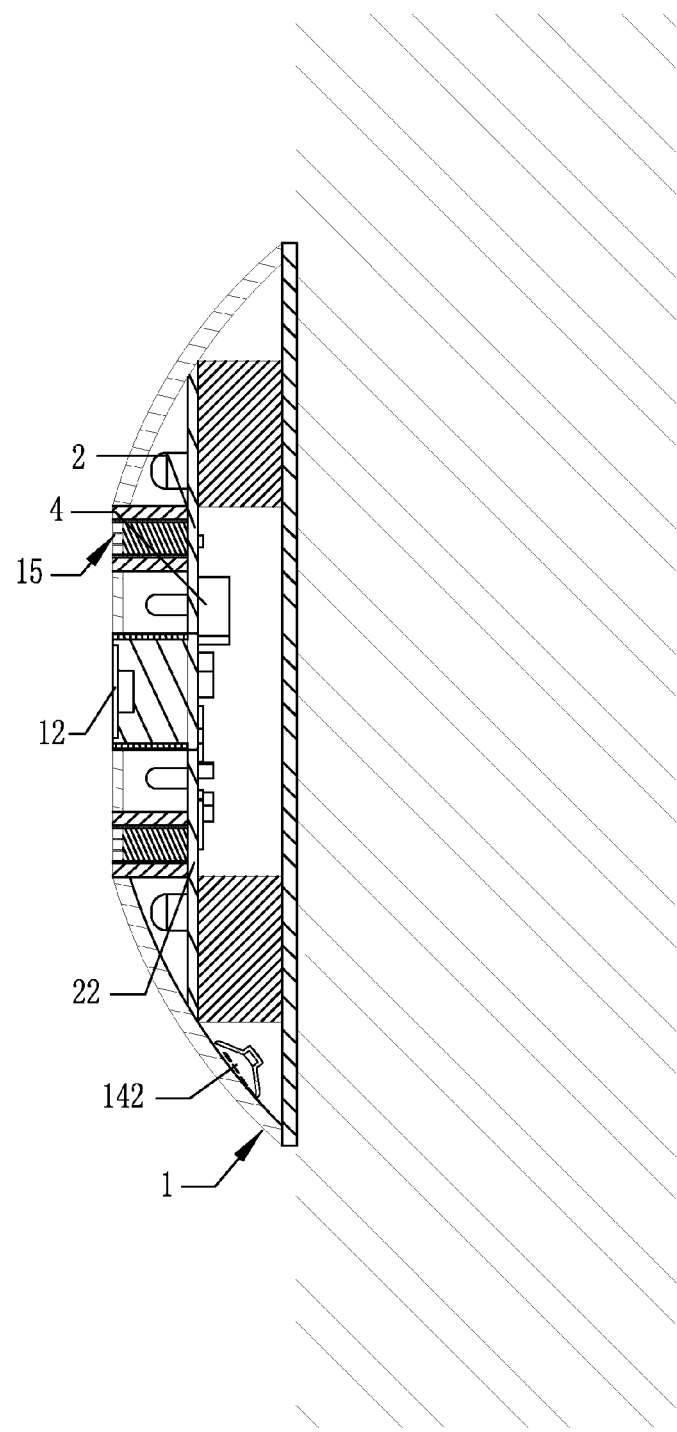
FIG. 15 is a schematic view illustrating an eighth embodiment of the present invention.
Figure 16:
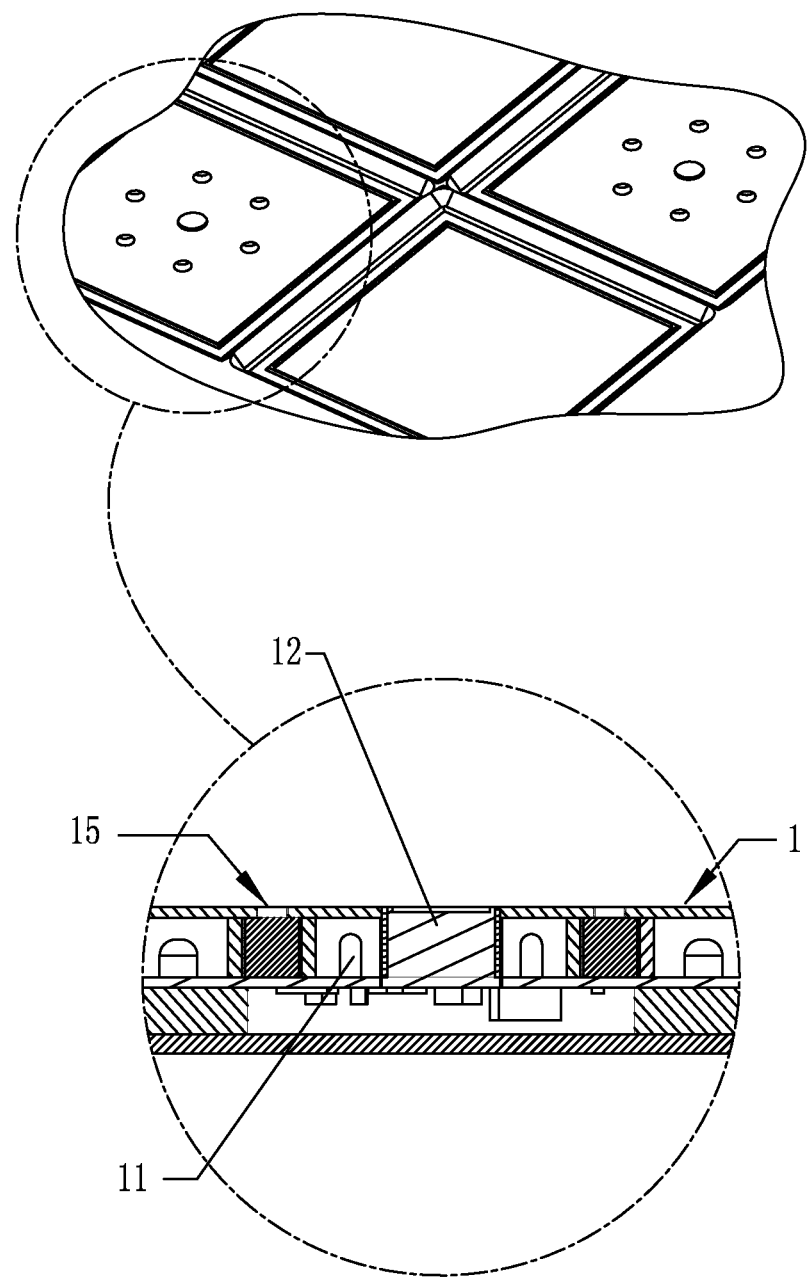
FIG. 16 is a schematic view illustrating a ninth embodiment of the present invention.

Referring to FIGS. 6-8, a second embodiment of the present invention is shown, which additionally includes a solar energy module (18) outside the housing (1) and electrically connected to the power input module (16) for storage with a solar energy battery (163) or a secondary battery (162) to serve as the primary power supply or a backup power supply for the present invention. When the solar energy storage is used as the primary power supply, it is commonly used as a street lamp powered by sun light, as shown in FIG. 8, where the solar energy module (18) is directly mounted on and located above the housing (1). FIG. 6 shows a helical head is provided on the housing (1) for use with a power supply of 100-200V.

Referring to FIGS. 6-10, the second and a third embodiments of the present invention are shown, which have a structure comprising a housing (1) in which a LED module (11) having multiple operation modes and a image capture module (12) are mounted, wherein the LED module (11) supplies continuous illumination, air quality indication, and flashing alarming; and the image capture module (12) functions for video recording and is provided with a separation hood (3) having a configuration comprising multiple layers serving as an arrangement of separation that prevents light sources or components from interfering with each other, the above structure being arranged in a lower portion of the housing (1) shown in the drawings. According to the multiple layer arrangement of separation, arranged in the interior of the housing (1) are a main control board (2) and a central processing device (4), and a remote control module (14) for transmission and receiving of infrared ray and voices, and a wireless transmission module (19) connectable through Bluetooth, WIFI, Z-WAVE™, an environment module (15) having the functions of detecting temperature and humidity, air quality, and gas and smoke, a recognition module (13) for detecting body temperature and the condition of a bio-target; with electrical connection being made between the main control board (2) and each of the module, the central processing device (4) identifies a target and environment set-up standards and these modules can be additionally included or removed according to a practical need, not limited to what described above.

The body temperature detection module (131) and the bio-recognition module (132) of the recognition module (13) are arranged in an intermediate layer of the housing (1) and this is generally because a motor (21) is additionally provided in an upper layer of the housing (1) for rotation adjustment of the intermediate layer so that the recognition module (13) and the image capture module (12) are operable in combination with the servo motor (21) to achieve synchronization of people and image taking and the living of an elder people in the house can be automatically monitored to provide the best range of monitoring. The bio-recognition module (132) may, in operation, penetrate through the housing (1) to conduct the operation thereof without being constrained by the shape and structure so that the installation can be flexible. The upper layer of the housing (1) is also provided with a power input module (16) to maintain the basic detection and lighting operations of the present invention. Most of the components are operated in the same ways as those discussed with the first and second embodiments so that repeated description will be omitted. Further, in each embodiment, the housing (1) is provided, at suitable locations, with multiple heat dissipative fins (102) for lowering down interior temperature of the housing (1) to maintain normal operation of the device.

Referring to FIGS. 11-16, which illustrate fourth to ninth embodiments of the present invention, which are respectively a florescent light, a ceiling light, an embedded light, a bay light, a wall light, and a fluorescent panel light, which can involve a structure based on that of the first to third embodiment so that no repeated description will be given here. The present invention is easily applicable to various types of lighting fixtures according to different types of environments, not limited to any specific fixed fashion of arrangement, allowing the present invention to be more widely used.

In summary, the present invention provides a modular multifunctional bio-recognition lighting device, which involves a main control board (2) and central processing device (4) arranged in a structural interior to connect environment modules (15) of different functions for monitoring and surveillance purposes and also connectable with an indicator module (17) for reminder or alarm purposes in order to provide a safe and secured living environment and to help improve security of the use in the environment. Further, with connection with a recognition module (13), a remote control module (14) and a wireless transmission module (19), different functions can be combined to improve the environment in which the lighting device is installed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A modular multifunctional bio-recognition lighting device, comprising:
   a housing, which has an interior space in which an LED module having multiple operation modes and an image capture module are arranged, the LED module supplying continuous illumination, air quality indication, and flashing alarming, the image capture module functioning for video recording;
   a remote control module for receiving and transmission of infrared ray and voices;
   a environment module having a function of detecting gas and smoke;
   a recognition module for body detection and identifying condition of a bio-target;
   a main control board, electrically connected with the above modules to be collectively arranged in the housing, the main control board comprising a central processing device for identifying a target and environment set-up standards for activating or de-activating a corresponding function; and
   an indicator module, the indicator module comprising a gas and smoke alarm indicator, and a temperature and humidity indicator for connection with the main control board to provide lighting indication as a reminder or alarm.

2. The modular multifunctional bio-recognition lighting device according to claim 1, wherein the environment module further comprising:
   a gas detector for detecting hazardous gases outside the housing;
   a smoke detector for detecting smoke outside the housing;
   a temperature and humidity detector for detecting temperature and humidity of an outside environment of the housing; and
   an air quality detector for detecting content of suspending particles in the outside environment of the housing, detection data being fed to the main control board for identification and activation and de-activation of a corresponding operation;
   wherein installation of the gas detector, the smoke detector, the temperature and humidity detector, and the air quality detector is achieved with at least one or two or more selected from the above modules.

3. The modular multifunctional bio-recognition lighting device according to claim 1, wherein the remote control module further comprises:
   an infrared ray module comprising an infrared remote control for transmission of coding for connection with a household appliance with infrared ray;
   an audio module having functions of receiving, identifying, voice instruction, and broadcasting; and
   a wireless remote control module connectable through different frequencies to corresponding products and feeding data to the main control board for identification and operation of household appliance products connected with each of the modules.

4. The modular multifunctional bio-recognition lighting device according to claim 3, wherein installation of the infrared ray module, the audio module, and the wireless remote control module is achieved with at least one or two or more selected from the above modules.

5. The modular multifunctional bio-recognition lighting device according to claim 1 further comprising: a wireless transmission module arranged in the housing and electrically connected with the main control board, the wireless transmission module comprising a Bluetooth module, a WIFI module, and a Z-Wave Module™, the Bluetooth module connectable with a household appliance product with Bluetooth; the WIFI module connectable with a household appliance product WIFI, the Z-Wave Module™ driving a household appliance product connected thereto with a relatively low voltage and feeding data back to the main control board for identification and operation of household appliance products connected with each of the modules;
 wherein the installation of the Bluetooth module, the WIFI module, and the Z-Wave Module™ is achieved with at least one or two or more selected from the above modules.

6. The modular multifunctional bio-recognition lighting device according to claim 1, wherein the recognition module further comprises:
 a body temperature detection module for detecting temperature and movement of a target; and
 a bio-recognition module for detecting position of a target;
 wherein detection data are fed to the main control board for judging and activating and de-activating a corresponding operation.

7. The modular multifunctional bio-recognition lighting device according to claim 1 further comprising: a power input module in electrical connection with the main control board for being supplied for the operation of each module and comprising one of a primary battery, a secondary battery, and a solar energy battery.

8. The modular multifunctional bio-recognition lighting device according to claim 7 further comprising: a solar energy module electrically connected with the power input module, the solar energy module being arranged on a surface of the housing for conversion and storage of additional electrical power.

9. The modular multifunctional bio-recognition lighting device according to claim 1 further comprising: at least one or more than one motor, the motor being arranged inside the housing and connected to the recognition module for adjusting sensing angle and direction of the recognition module, the motor further connected to the image capture module for expansion of range of sensing and video recording.

10. The modular multifunctional bio-recognition lighting device according to claim 6, wherein the recognition module is combined with the image capture module and is further combined with one of the body temperature detection module and the bio-recognition module.

11. The modular multifunctional bio-recognition lighting device according to claim 1 further comprising: an LED board arranged in the housing and electrically connected to the main control board, the LED board and the main control board each having a single board or multiple board arrangement according to space structure.

* * * * *